United States Patent
Kawahara et al.

(10) Patent No.: US 7,850,255 B2
(45) Date of Patent: Dec. 14, 2010

(54) ELECTRO-MECHANICAL BRAKE SYSTEM AND ELECTRO-MECHANICAL BRAKE APPARATUS USED THEREFOR

(75) Inventors: Yoshinari Kawahara, Fukuoka (JP); Atsushi Yokoyama, Yamato (JP); Satoru Kuragaki, Isehara (JP); Hirotaka Oikawa, Yokohama (JP); Kenji Hiraku, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 1012 days.

(21) Appl. No.: 11/599,489

(22) Filed: Nov. 15, 2006

(65) Prior Publication Data

US 2007/0114843 A1 May 24, 2007

(30) Foreign Application Priority Data

Nov. 16, 2005 (JP) ............................. 2005-331863

(51) Int. Cl.
*B60T 8/88* (2006.01)
(52) U.S. Cl. ...................... 303/122.1; 303/124; 303/162
(58) Field of Classification Search ................. 303/122, 303/122.03, 122.08, 122.1, 122.14, 124, 303/162, 112
See application file for complete search history.

(56) References Cited

U.S. PATENT DOCUMENTS 6,702,405 B1   3/2004   Balz et al.

2003/0066719 A1*  4/2003  Watanabe et al. .......... 188/72.7
2005/0258683 A1*  11/2005  Yamaguchi .................. 303/89

FOREIGN PATENT DOCUMENTS

| EP | 0 924 128 A1 | 6/1999 |
| EP | 0 945 322 A2 | 9/1999 |
| EP | 1 686 029 A1 | 8/2006 |
| JP | 2001-206209 | 7/2001 |

OTHER PUBLICATIONS

European Search Report dated Mar. 20, 2007 (Six (6) pages).

* cited by examiner

*Primary Examiner*—Xuan Lan Nguyen
(74) *Attorney, Agent, or Firm*—Crowell & Moring LLP

(57) ABSTRACT

The invention provides an electro-mechanical brake system which can keep a stop state even if a malfunction is generated in a parking brake, and an electro-mechanical brake apparatus used for the electro-mechanical brake system. An electro-mechanical brake actuator presses a brake pad to a disc rotor so as to independently brake a braking force of each of wheels. A parking brake is constituted by a pawl portion attached to a motor of a motor driving the electro-mechanical actuator and a latch. A main controller detects a failure of the parking brake on the basis of a motor displacement at a time of reducing a motor current, and increases the pressing force in the remaining normal parking brake in the case that the parking brake failure in one wheel or more is detected.

5 Claims, 7 Drawing Sheets

ELECTRO-MECHANICAL BRAKE SYSTEM AND ELECTRO-MECHANICAL BRAKE APPARATUS USED THEREFOR

BACKGROUND OF THE INVENTION (1) Field of the Invention

The present invention relates to an electro-mechanical brake system and an electro-mechanical brake apparatus used for the electro-mechanical brake system, and more particularly to an electro-mechanical brake system preferably employed for a system provided with a parking brake function and an electro-mechanical brake apparatus used for the electro-mechanical brake system.

(2) Description of the Related Art

Conventionally, as a control method of specifying a normal brake line system in the case that a brake line system gets out of order, and carries over a brake control by one brake line system, in an electro-mechanical brake system having two brake line systems, there has been known a method described in patent document 1 (JP-A-2001-206209). In this example, in the case that an ascent of a braking pressure is not detected at a time of a pressure intensifying control in an electronic control brake system having two brake line systems combined and connected to one pressure regulating portion, each of the brake line systems is coupled to the pressure regulating portion one by one, and it is detected whether or not the braking pressure of the coupled brake line system is ascended. Accordingly, it is determined that the brake line system in which the ascent of the braking pressure is confirmed is normal, and the brake control is carried over only by the normal brake line system. In accordance with this method, even in the case that any malfunction is generated in the brake line system, it is possible to control the brake on the basis of the electronic control in place of a braking operation by a human power, and it is possible to avoid a deterioration of an operability and a deterioration of a safety.

However, in the structure described in JP-A-2001-206209, there is not disclosed a safety in the case that that the parking brake gets out of order. In general, in the case that the parking brake gets out of order, the parking brake can be substituted by setting a transmission to a low speed gear in a vehicle having a manual transmission or setting a transmission to a parking range in a vehicle having an automatic transmission. However, (1) in the case that a malfunction of the parking brake is identified by outputting a parking brake actuation instruction in a state in which a driver cancels a regular brake, or (2) in the case that the malfunction of the parking brake is identified after outputting the parking brake actuation instruction and canceling the regular brake in a state in which the driver applies the regular brake, there is a possibility that a stop state of the vehicle is not maintained and a danger is generated.

Further, in an electro-mechanical parking brake apparatus in which a braking member is actuated by a power generated by a motor, a braking force is generated by a friction force generated between the braking member and a braked member, and a stop state of a vehicle is held by a pad pressing force holding means, a parking brake actuation state is generated after a parking brake actuation switch is operated and an operation of the pressing force holding means and an operation check thereof are finished. Accordingly, a time required until the parking brake actuation state is generated after the parking brake actuation switch is operated becomes longer than a wire type parking brake apparatus. Therefore, there is a possibility that a probability at which the states in the items (1) and (2) are generated becomes higher, and a brake control at a time when the malfunction of the parking brake is generated is necessary.

SUMMARY OF THE INVENTION

An object of the present invention is to provide an electro-mechanical brake system which can keep a stop state even if a malfunction is generated in a parking brake, and an electro-mechanical brake apparatus used for the electro-mechanical brake system.

(1) In order to achieve the object mentioned above, in accordance with the present invention, there is provided an electro-mechanical brake system comprising:

a brake apparatus pressing a brake member to a braked member so as to independently controlling braking forces of respective wheels;

parking brakes; and parking brakes malfunction detecting means for detecting a malfunction of the parking brake, wherein the electro-mechanical brake system is provided with a control means for increasing the pressing force between the braking member and the braked member in the remaining normal parking brakes, in the case that the parking brake failure in one wheel or more is detected by the parking brake malfunction detecting means.

In accordance with the structure mentioned above, even in the case that the malfunction is generated in the parking brake, it is possible to hold the parking state, and it is possible to improve a safety.

(2) In the item (1) mentioned above, the structure may be preferably made such that the control means starts the operation of the parking brake, and generates the braking force capable of temporarily keeping the stop state by the brake apparatus which does not use the function of the parking brake, in the case that the parking brake actuation instruction is generated.

In accordance with the structure mentioned above, it is possible to securely keep the stop state temporarily even in the case that the failure of the parking brake is detected.

(3) In the item (2) mentioned above, the structure may be preferably made such that the control means cancels the braking by the brake apparatus which does not use the parking brake function, in the case that the parking brake function is achieved after the parking brake actuation instruction is generated.

In accordance with the structure mentioned above, it is possible to suppress an energy consumption by the braking, and it is possible to prevent a heat generation of a coil in a motor.

(4) In the item (1) mentioned above, the structure may be preferably made such that the electro-mechanical brake system is provided with a transmission capable of operating without being constrained by an operation of a driver, and the control means actuates the remaining normal parking brakes at a time when one or more parking brake function is failed, and generates an actuation instruction of making the transmission select a predetermined low speed change gear ratio.

In accordance with the structure mentioned above, it is possible to keep the stop state by setting the transmission set to the low speed as an alternative of the parking brake even at a time when the parking brake function is failed. Further, even in the case that all the parking brakes provided in the vehicle are failed, it is possible to maintain the parking state on the basis of the operation of the transmission.

(5) In the item (4) mentioned above, the structure may be preferably made such that the electro-mechanical brake system is provided with a road surface slope state detecting means for detecting a state of a road surface slope state, and the control means changes an actuation instruction for actuating the transmission on the basis of the slope state of the road surface detected by the road surface slope state detecting means at a time when the parking brake function failure is generated.

In accordance with the structure mentioned above, even in the case that the parking brake function failure is identified by actuating the parking brake at a time of parking on a sloping road, and the transmission is set to the alternative of the parking brake, it is possible to improve the safety of the parking. Further, even in the case that all the parking brakes provided in the vehicle are failed, it is possible to maintain the parking state on the basis of the operation of the transmission.

(6) In the item (5) mentioned above, the structure may be preferably made such that the electro-mechanical brake system is provided with a steering wheel capable of being actuated without being constrained by an operation of a driver, and the control means actuates the normal parking brake and the transmission, and generates an instruction for operating the steering wheel, in the case that it is determined by the road surface slope state detecting means that a slope of the road surface is steeper than a predetermined value at a time when one or more parking brake function is failed.

In accordance with the structure mentioned above, even in the case that the brake function failure is identified by actuating the parking brake at a time of parking on the sloping road having the steep slope, it is possible to increase a friction force applied to a portion between the road surface and the tire wheel by operating the steering wheel, and it is possible to improve the safety of the stop state.

(7) Further, in order to achieve the object mentioned above, in accordance with the present invention, there is provided an electro-mechanical brake system comprising:

a brake apparatus pressing a braking member to a braked member on the basis of a power of a motor so as to brake a wheel;

a latch portion actuating together with the motor;

a latch mechanism engaging with the latch portion so as to regulate an actuation of the motor;

a parking brake having a latch actuating means for actuating the latch mechanism; and a control means lowering a value of a current flowing through a coil of the motor after the actuation of the latch mechanism, and regulating a pressing force between the braking member and the braked member larger than the pressing force at a time of actuating the latch mechanism in the case that the pressing force is lowered at a rated value or more, thereby again actuating the latch mechanism.

In accordance with the structure mentioned above, even in the case that the malfunction is generated in the latch portion, it is possible to more securely apply the parking brake by outputting the greater pressing force so as to actuate the latch portion and change the position of the latch portion to be latched.

(8) In the item (7) mentioned above, the structure may be preferably made such that the control means lowers the value of the current flowing through the coil of the motor after the latch mechanism is actuated, and generates an alarm indicating the malfunction of the parking brake mechanism in the case that the pressing force between the braking member and the braked member is lowered at the rated value or more.

In accordance with the structure mentioned above, it is possible to discriminate the malfunction of the parking brake so as to secure the safety.

(9) In the item (7) mentioned above, the structure may be preferably made such that the control means determines the malfunction of the parking brake in the case that a number of rotation at which the latch mechanism is again actuated reaches a predetermined number.

In accordance with the structure mentioned above, it is possible to securely detect the malfunction of the parking brake without detecting the case that the parking brake actuation is simply failed as the malfunction.

(10) In the item (7) mentioned above, the structure may be preferably made such that the control means monitors an applied current of the motor, and an applied current of the latch actuating means, and generates an alarm in the case of detecting the failure of the motor or the latch actuating means.

In accordance with the structure mentioned above, it is possible to previously know the failure of the parking brake function at a time when the drive operates the parking brake actuation switch.

(11) Further, in order to achieve the object mentioned above, in accordance with the present invention, there is provided an electro-mechanical brake apparatus pressing a braking member to a braked member on the basis of a direct acting force obtained by converting a rotation of a motor into a direct acting motion so as to generate a braking force, the electro-mechanical brake apparatus comprising:

a latch portion fixed to a rotor of the motor;

a one-way solenoid;

a link mechanism constituted by a solenoid rod driven by the solenoid, and a latch rod engaging with the solenoid rod so as to be actuated, and having a latch; and a parking brake holding a braking force by regulating a motion of the rotor by the latch.

In accordance with the structure mentioned above, it is possible to inexpensively add the parking brake function only by installing the single latch mechanism in the electro-mechanical brake apparatus actuated by the existing motor.

In accordance with the present invention, it is possible to hold the stop state even in the case that the malfunction is generated in the parking brake.

Other objects, features and advantages of the invention will become apparent from the following description of the embodiments of the invention taken in conjunction with the accompanying drawings.

DETAILED DESCRIPTION OF THE INVENTION

A description will be given below of a structure and an operation of an electro-mechanical brake system in accordance with a first embodiment of the present invention with reference to FIGS. 1 to 5.

First, a description will be given of a system structure of the electro-mechanical brake system in accordance with the present embodiment with reference to FIG. 1.

Figure 1:
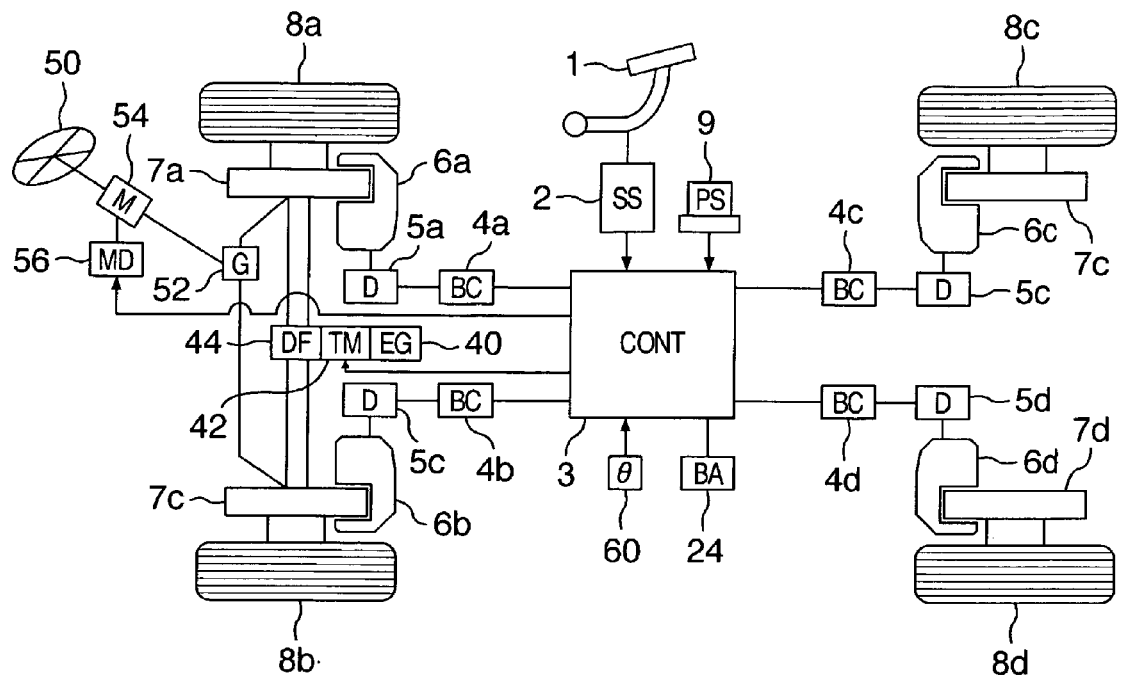
FIG. 1 is a system block diagram showing a system structure of an electro-mechanical brake system in accordance with a first embodiment of the present invention.

FIG. 1 is a system block diagram showing the system structure of the electro-mechanical brake system in accordance with the first embodiment of the present invention.

A driving force of an engine (EG) 40 is shifted by a transmission (TM) 42, is transmitted to each of front wheels 8a and 8b via a differential gear (DF) 44, and rotationally drives the front wheels 8a and 8b. In this case, as a power source, in place of the engine 40, a motor may be employed, or a hybrid system comprising the engine and the motor may be employed. The transmission 42 may be constituted by an automatic transmission or a manual transmission. In this case, at a time of applying a second embodiment mentioned below, it is necessary that the transmission 42 employs an electronically controlled automatic transmission provided with an actuator electronically executing a shift operation, an automatic transmission controlling a change of a shift gear by an actuator, or the like.

When rotating a steering wheel 50, a rotational driving force is transmitted to the front wheels 8a and 8b via a steering gear 52 so as to steer the front wheels 8a and 8b. As a mechanism for assisting a steering operation, an electro-mechanical power steering is provided. The electro-mechanical power steering is constituted by a motor 54, and a motor driver 56 driving the motor 54. In this case, as the power steering a hydraulic mechanism may be employed in addition to the electro-mechanical mechanism.

The front wheels 8a and 8b and rear wheels 8c and 8d are respectively provided with disc rotors 7a, 7b, 7c and 7d. The disc rotors 7a, 7b, 7c and 7d are respectively rotated together with the front wheels 8a and 8b and the rear wheels 8c and 8d. Electro-mechanical brake actuators 6a, 6b, 6c and 6d push the disc rotors 7a, 7b, 7c and 7d so as to slide. In this case, the electro-mechanical brake actuators 6c and 6d provided in the rear wheel are provided with a parking brake function.

An amount of displacement of the brake pedal 1 is converted into an electric signal by a stroke sensor 2, and is input to a main controller 3. Further, a parking brake signal output in the case that a parking brake operation switch 9 is operated is input to the main controller 3. A road surface slope sensor 60 detects an angle of incline of a road surface at which the vehicle is positioned, and inputs a detected road surface slope signal to the main controller 3. In this case, the road surface slope sensor 60 is used in a second embodiment and a third embodiment which are mentioned below, and is not essential for the first embodiment.

The main controller 3 generally controls a braking force of each of four wheels on the basis of an electric signal from the stroke sensor 2, and the rear wheel electro-mechanical brake actuators 6c and 6d control the parking brake function on the basis of a parking brake signal from the parking brake operation switch 9.

Electro-mechanical brake controllers 4a, 4b, 4c and 4d control electro-mechanical brakes of respective wheels on the basis of an electric signal output from the main controller 3. Drivers 5a, 5b, 5c and 5d input electric current to motors of the electro-mechanical brake actuators 6a, 6b, 6c and 6d of the respective wheel on the basis of the electric signals output from the electro-mechanical brake controllers 4a, 4b, 4c and 4d, actuate the motor, actuate solenoids provided in the electro-mechanical brake actuators 6c and 6d of the rear wheels, and actuate a parking brake function.

An electric power of a battery (BA) 24 is supplied to the main controller 3, is supplied to the motors of the electro-mechanical brake actuators 6a, 6b, 6c and 6d via the drivers 5a, 5b, 5c and 5d, and is supplied to the motor 54 via the solenoids of the electro-mechanical brake actuators 6c and 6d, and the motor driver 56.

Next, a description will be given of a structure of the electro-mechanical brake actuators 6a, 6b, 6c and 6d used in the electro-mechanical brake system in accordance with the present embodiment with reference to FIG. 2.

Figure 2:
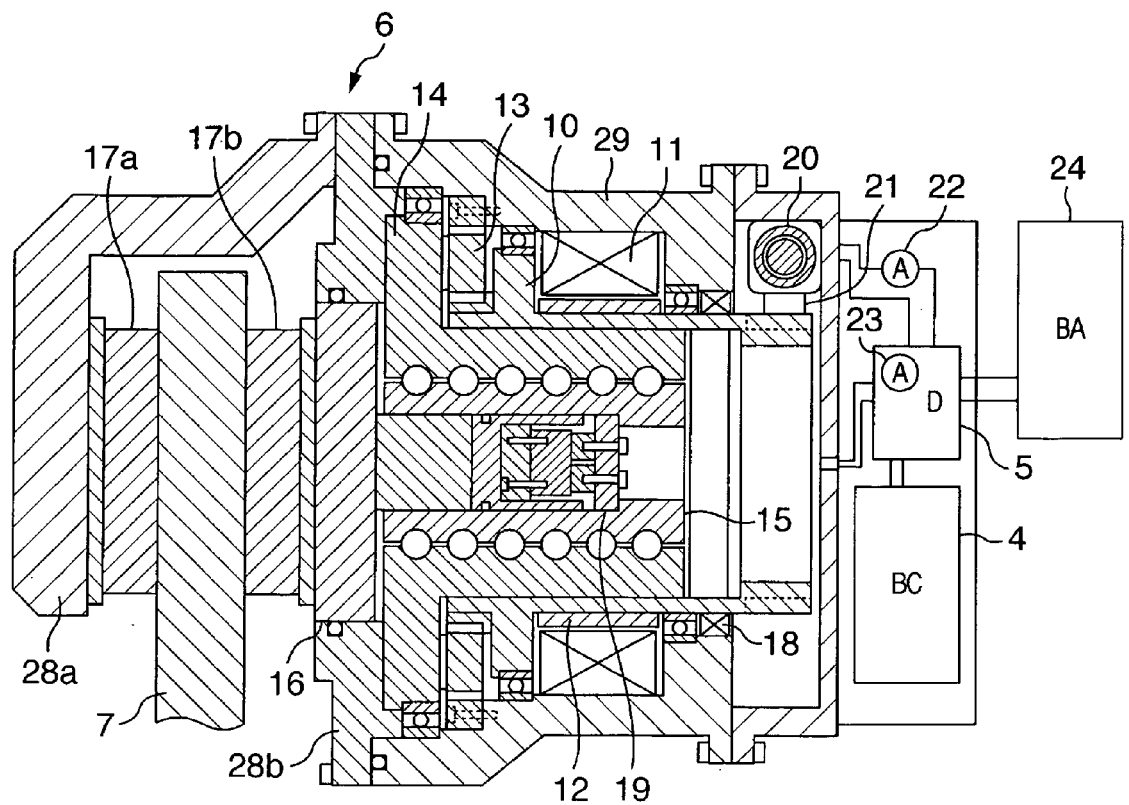
FIG. 2 is a cross sectional view of a main portion and shows a structure of an electro-mechanical brake actuator used in the electro-mechanical brake system in accordance with the first embodiment of the present invention.

FIG. 2 is a cross sectional view of a main portion and shows a structure of the electro-mechanical brake actuator used in the electro-mechanical brake system in accordance with the first embodiment of the present invention. In this case, the same reference numerals as those in FIG. 1 indicate the same parts.

The electro-mechanical brake actuator 6 shown in FIG. 2 corresponds to a structure of the electro-mechanical brake actuators 6c and 6d of the rear wheels having the parking brake function. The electro-mechanical brake actuators 6a and 6b of the front wheels is structured by removing the parking brake function from the electro-mechanical brake actuator 6 shown in FIG. 2.

The motor portion of the electro-mechanical brake actuator 6 is constituted by a motor coil 11 fixed to an inner peripheral side of a motor stator 29, a motor rotor 10 rotating in accordance with a change of magnetic field of the motor coil 11, a magnet 12 fixed to the motor rotor 10, and a resolver 18 for detecting a rotational displacement of the motor rotor 10. An electric current from the motor driver 5 controlled by the electro-mechanical brake controller 4 is input to the motor coil 11, changes a magnetic field generated by the motor coil 11, and rotates the motor rotor 10. The resolver 18 is used for controlling the rotation of the motor, and is used for measuring the displacement of the motor. A displacement information of the motor detected by the resolver 18 is input to the main controller 3.

A rotating speed of the motor rotor 10 of the motor is decelerated by a speed reducer 13, and a rotating torque of the motor rotor 10 is amplified so as to be transmitted to a rotation direct acting converting mechanism. The rotation direct acting converting mechanism is structured such as to convert a rotating motion decelerated by the speed reducer 13 to the direct acting motion, and is constituted by a ball screw 14, and a piston 16 directly operated by a ball screw rod 15. A rotational motion of the ball screw 14 is converted into a direct action by the ball screw rod 15, and the piston 16 fixed to the ball screw rod 15 executes a direct acting motion. The ball screw 14 corresponding to the rotation direct acting converting mechanism can use the other mechanism such as a ball lamp or the like.

Brake pads 17a and 17b corresponding to a braking member are respectively fixed to support members 28a and 28b.

The brake pad 17b is fixed to the piston 16, and is pressed to a disc rotor 7 corresponding to a braked member in the case that the piston 16 is moved in a leftward direction in the drawings. Pressing forces of the brake pads 17a and 17b are measured by a pressing force sensor 19, and are input to the main controller 3. An electric current flowing through the motor coil 11 is measured by a motor current sensor 23 and is input to the main controller 3.

Next, a description will be given of the parking brake mechanism. The parking brake mechanism is constituted by a latch 21 for constraining a rotating motion of the motor rotor 10, and a solenoid 20 for driving the latch 21. The parking brake mechanism is provided in the electro-mechanical brake actuators 6c and 6d for the rear wheels, and are not provided in the electro-mechanical brake actuators 6a and 6b for the front wheels. A description will be given later of a structure and an operation of the parking brake mechanism with reference to FIG. 3.

A description will be given of a control mechanism of a pad pressing force generated by the electro-mechanical brake apparatus shown in FIG. 2. The main controller 3 calculates a necessary braking force on the basis of a pedal applying amount of a driver or the like, and generates a pad pressing force instruction on the basis of the calculated braking force. The pad pressing force instruction is transmitted to the electro-mechanical brake controller 4 via a controller area network (CAN) communication. The electro-mechanical brake controller 4 calculates a deviation between the pad pressing force instruction and an actual pressing force measured by the pressing force sensor 19, and generates a motor current instruction signal necessary for reducing the pressing force deviation. The motor driver 5 applies the current corresponding to the motor current instruction signal to the motor coil 11. If the current is applied to the motor coil 11 and the motor rotor 10 generates a torque, the speed reducer 13 is rotated together with the motor rotor 10 so as to actuate the ball screw 14. The piston 16 executes the direct acting motion on the basis of the actuation of the ball screw 14, and the brake pad 17 is pressed to the disc rotor 7 or disconnected from the disc rotor 7. In the case that the brake pad 17 is pressed to the disc rotor 7, the brake pad 17 is deformed, and the pressing force is generated.

The motor corresponding to a drive source of the electro-mechanical brake apparatus in accordance with the present embodiment is a brushless motor constituted by a motor stator 29, a motor coil 11, a motor rotor 10, magnet 12 fixed to the motor rotor 10 and a bearing. The brushless motor is controlled by the motor driver 5 by using a measured value of a resolver 18 for detecting the rotational displacement of the motor rotor 10, and a measured value of the motor current sensor 23 measuring a value of the electric current flowing through the motor coil 11.

Next, a description will be given of a structure and an operation of the parking brake mechanism used in the electro-mechanical brake system in accordance with the present embodiment with reference to FIG. 3.

Figure 3A:
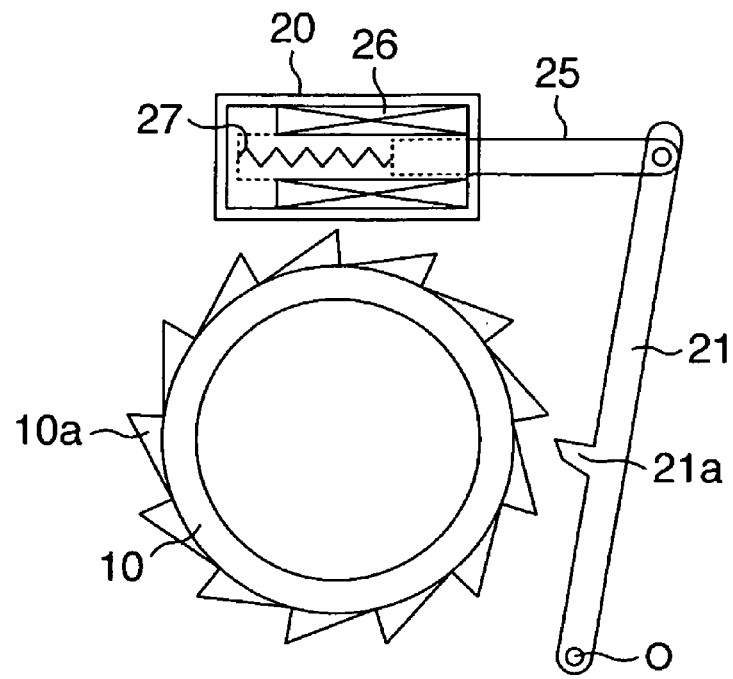
FIGS. 3A and 3B are a side elevational view showing a structure of a parking brake mechanism used in the electro-mechanical brake system in accordance with the first embodiment of the present invention.
Figure 3B:
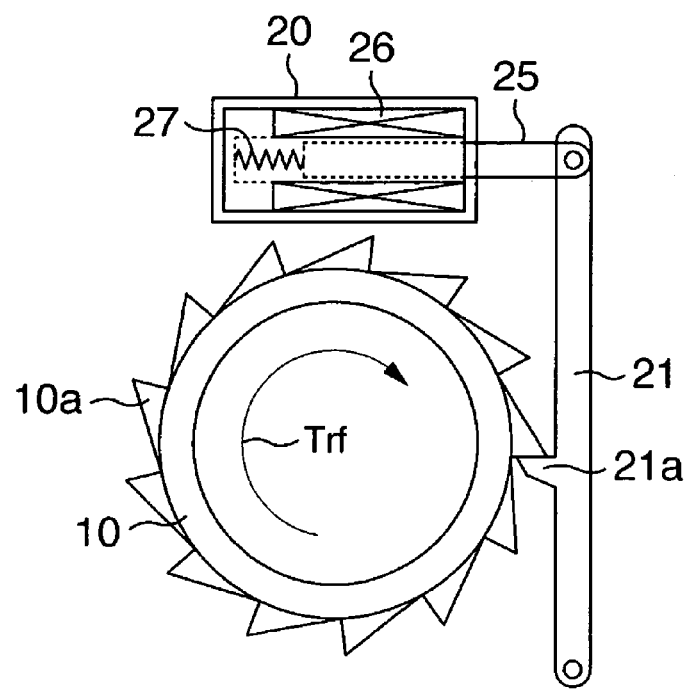

FIG. 3 is a side elevational view showing a structure of the parking brake mechanism used in the electro-mechanical brake system in accordance with a first embodiment of the present invention. In this case, FIG. 3A shows a canceled state of the parking brake, and FIG. 3B shows an ON state of the parking brake. Further, the same reference numerals as those in FIG. 2 denote the same parts.

As shown in FIG. 3, the parking brake mechanism of the present embodiment is constituted by the motor rotor 10 provided with a plurality of latch portions 10a in an outer periphery, a latch 21a constraining a rotation of the motor rotor by locking a latch portion 10a of the motor rotor 10, and the solenoid 20 for driving the latch 21a. The latch 21a is provided in the latch rod 21.

A link mechanism is formed by the latch rod 21 and the solenoid rod 25. One end of the latch rod 21 can be rotated around a supporting point O. The other end of the latch rod 21 is rotatably engaged with one end of the solenoid rod 25. The other end of the solenoid rod 25 is actuated by the solenoid 20.

The solenoid 20 is schematically structured by a solenoid coil 26, a solenoid spring 27 and the solenoid rod 25. In the case that the electric current is not applied to the solenoid coil 26, the solenoid rod 25 comes to a state of being pressed out by an energizing force of the solenoid spring 27, however, if the electric current is applied to the solenoid coil 26, the solenoid rod 25 is sucked by a magnetic field generated by the solenoid coil 26, and the solenoid spring 27 is compressed.

FIG. 3A shows a state in which the latch 21 is not engaged with a ratchet of the motor rotor 10, that is, a state at a time of canceling the parking brake. In this case, since the electric current is not applied to the solenoid coil 26, but the solenoid rod 25 is pushed out, the motor rotor 10 can freely rotate.

FIG. 3B shows a parking brake operating state in which the latch 21 is engaged with the pawl 10a of the motor rotor 10 and the motion of the motor rotor 10 is constrained. In the motor rotor 10 in FIG. 3, a clockwise direction is set to a piston backward moving direction (a brake canceling direction), and a counterclockwise direction is set to a piston forward moving direction (a pad pressing force increasing direction). In a state in which the pressing force is generated, a reaction force of the pressing force is transmitted as a torque Trf to the motor rotor 19 via the ball screw 14 and the speed reducer 13, however, the torque Trf is applied in the clockwise direction in FIG. 3. Accordingly, in FIG. 3B, in the case that the current is not applied to the motor coil 11, and the motor itself does not generated any torque, the latch 21 receives the force in a direction of an arrow Trf from the pawl portion 10a of the motor rotor 10. Since a friction force is generated between the latch 21 and the pawl portion 10a of the motor rotor 10 on the basis of the force, the solenoid rod 25 is not pushed out by an energizing force of the solenoid spring 27 even if the electric current is not applied to the solenoid coil 26 accordingly, it is possible to maintain a state in which the motor rotor 10 is constrained, that is, the parking brake operating state.

In the case of canceling the parking brake from the parking brake operating state, the motor rotor 10 is rotated at one pawl of the pawl portion 10a in the counterclockwise direction in a state in FIG. 3B. Accordingly, the friction force applied to a portion between the latch 21 and the pawl portion 10a is lost, and the latch 21 is canceled by the energizing force of the solenoid spring 27. In FIG. 3B, since the latch 21 constrains only the rotation of the motor rotor 10 in the clockwise direction, it is possible to rotate the motor rotor 10 in the counterclockwise direction in the parking brake operating state.

Next, a description will be given of a control operation of the parking brake mechanism used in the electro-mechanical brake system in accordance with the present embodiment at time when it is out of order, with reference to FIG. 4.

Figure 4:
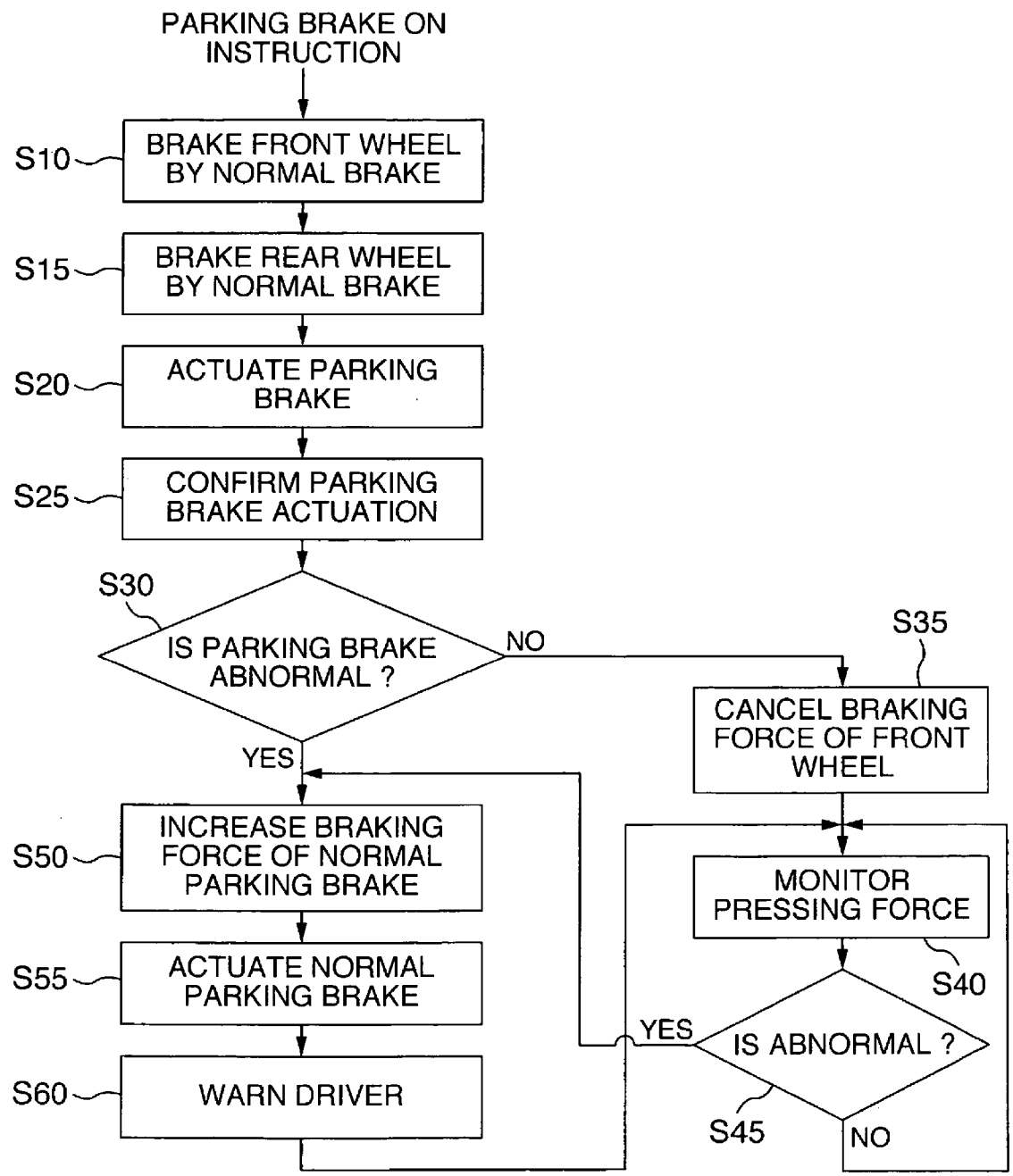
FIG. 4 is a flow chart showing a control content at a time when the parking brake mechanism used in the electro-mechanical brake system in accordance with the first embodiment of the present invention gets out of order.

FIG. 4 is a flow chart showing a control contents of the parking brake mechanism used in an electro-mechanical brake system in accordance with a first embodiment of the present invention. The control of the present embodiment is executed by the main controller 3. In this case, it is possible to execute by the electro-mechanical brake controller 4.

In this case, as described in FIG. 2 by exemplifying a four-wheeled vehicle, a description will be given of the case that the electro-mechanical brake apparatus having the parking brake function is installed to the right and left rear wheels, and the electro-mechanical brake apparatus having no parking brake function is installed to the right and left front wheels.

First, the driver operates the parking brake operating switch 9, whereby a parking brake actuation instruction is input to the main controller 3. Then, in a step s10, the controller 3 generates a braking force capable of securely holding the vehicle stop by the electro-mechanical brakes 6a and 6b in the front wheels, and generates a braking force capable of securing the vehicle stop by the electro-mechanical brakes 6c and 6d in the rear wheels, in a step s15.

Next, in a step s20, the controller 3 actuates the parking brakes in the electro-mechanical brakes 6c and 6d in the rear wheels by applying the solenoid 20 shown in FIG. 3.

Next, the controller 3 executes a parking brake actuation confirmation in a step s25, and judges whether or not the parking brake is abnormal in a step s30.

In this case, a description will be given of a judging method of the abnormality of the parking brake in the electro-mechanical brake system in accordance with the present embodiment with reference to FIG. 5.

Figure 5A:
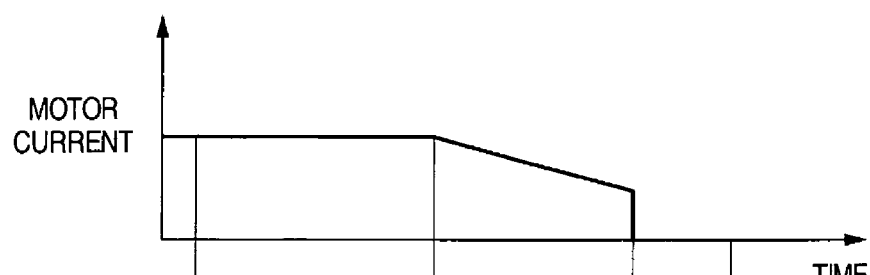
FIGS. 5A-5C are an explanatory view of a method of diagnosing an abnormality of a parking brake in the electro-mechanical brake system in accordance with the first embodiment of the present invention.
Figure 5B:
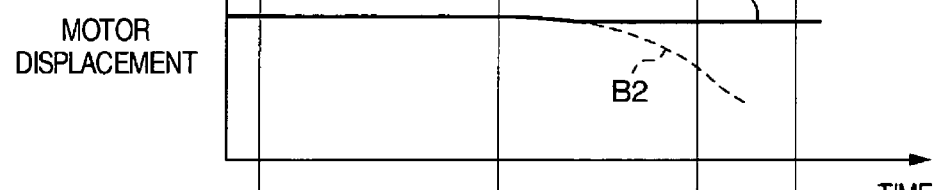
Figure 5C:
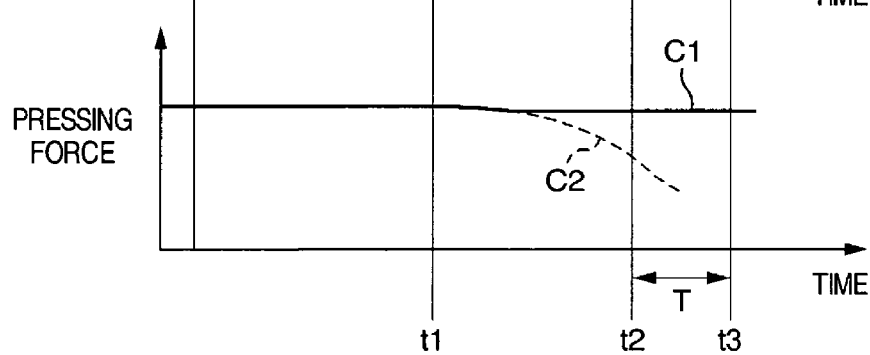

FIG. 5 is an explanatory view of the judging method of the parking brake abnormality in the electro-mechanical brake system in accordance with the first embodiment of the present invention. FIG. 5A shows a motor current applied to the motors of the electro-mechanical brakes 6c and 6d, FIG. 5B shows a motor displacement of the motors of the electro-mechanical brakes 6c and 6d, and FIG. 5C shows a pressing force of the motors of the electro-mechanical brakes 6c and 6d. Each of these drawing shows a time history by setting a horizontal axis to a time. Further, in FIGS. 5B and 5C, solid lines B1 and C1 show the time history at a time when the parking brake is normal, and broken lines B2 and C2 show the time history at a time when the parking brake is abnormal.

In FIG. 8, it is assumed that a state in which the drive of the latch 21 by the solenoid 20 is finished is established at a time t1. If the controller 3 reduces the motor current step by step as shown in FIG. 5A, for confirming the parking brake actuation, from the time t1, the motor rotor 10 is exposed to the torque caused by the reaction force of the pad pressing force. Therefore, the motor rotor 10 is rotated in a direction in which the pressing force is lowered.

If the latch 21a and the ratchet are normal, the latch 21a is engaged with the pawl portion 10a finally even in the case that the motor current is reduced as shown in FIG. 5A, so that the rotation of the motor rotor 10 stops as sown by a solid line B1 in FIG. 5B. The motor displacement can be detected by the resolver 18 shown in FIG. 2.

On the contrary, in the case that the latch 21a is not normally actuated, or in the case that the pawl of the pawl portion 10a is broken, the motor rotor 10 is largely rotated as shown by a broken line B2 in FIG. 5B and the pressing force is widely lowered as shown by a broken line C2 in FIG. 5C, by reducing the motor current.

In accordance with the operation mentioned above, in the electro-mechanical brake system described in FIG. 1, after the drive of the latch 21 is finished, the controller 3 starts reducing the motor current, and determines a failure of the parking brake actuation in the case that the motor is rotated at a rated amount or more.

In the case that the reduction of the pressing force becomes within a prescribed amount even if the motor current is reduced, the controller 3 cuts the motor current at a time t2 as shown in FIG. 5A, and cuts the current application to the solenoid coil 26. Thereafter, the controller 3 monitors the motor displacement for a time T, confirms that the motor displacement is not change, and thereafter generates a signal of the parking brake actuation end at a time t3. Accordingly, even in the case that the latch catches on an unstable place such as a top portion of the pawl or the like and the latch comes off by an impact generated at a moment of cutting the electric current of the motor and the solenoid coil, it is possible to recognize as a failure of the parking brake actuation.

The above corresponds to a method of detecting the abnormality of the actuation of the parking brake due to the problem in the engagement between the latch and the pawl portion, however, the abnormality of the motor and the solenoid can be detected as follows. In other words, the controller 3 appropriately applies an electric voltage to the motor coil and the solenoid coil in such a manner as to prevent the control of the electro-mechanical brake from being greatly affected, and detects the applied current to the solenoid and the applied current to the motor coil by ampere meters 22 and 23 shown in FIG. 2. In the case that it is impossible to detect the electric current by the ampere meters 22 and 23 in spite that the electric voltage is applied to the coil, the abnormality of the parking brake can be determined by assuming that there is generated a power mechanism failure such as disconnection of the motor coil or the solenoid coil or the like. When the parking brake is abnormal, an alarm is output to the driver. Since this alarm can be output even in the case that the brake or the parking brake is not actuated, it is possible to inform the failure before the driver uses the brake. Accordingly, there is a possibility that the driver can execute a compliant of avoiding the use of the brake.

Next, turning back to FIG. 4, in the case that the abnormality does not exist in the judgment of the step s30, the step goes to a step s35, and in the case that the abnormality exist, the step goes to a step s50.

In the case that the abnormality does not exists, the controller 3 cancels the braking force of the front wheel in the step s35, and monitors the parking brake pressing force of the rear wheel by the pressing force sensor in a step s40.

The braking force of the front wheel is canceled for the purpose of inhibiting an energy consumption continuously keeping applying the electric current to the motor in correspondence to the braking, and preventing the motor coil from being generated.

Further, in a step s45, the controller 3 judges whether or not the abnormality exists in the pressing force of the rear wheel. In the case that the abnormality does not exist, the controller 3 keeps monitoring the pressing force in the step s40, and in the case that the abnormality exist, the step goes to a step s50.

In the step s30, if the controller 3 determines that the abnormality exists in any one of the right and left parking brakes, the controller 3 increases the braking force of the normal parking brake in the step s50 so as to again apply the electric current to the solenoid 26 and actuates the parking brake in a step s55.

In this case, in order to securely keep the stop state, it is preferable that the braking force of the normal parking brake is set to a value corresponding to a total value of the pressing forces generated by the respective parking brakes in the case that both of the parking brakes of the right and left wheels are normal. In this case, in the case that an upper limit is provided in the pressing force at a time when the parking brake is actuated, for securing an endurance time of the electro-mechanical brake apparatus, the parking brake is actuated without regarding to the limit.

In the case that a reason of the failure of the parking brake actuation is caused by a breakage or an abrasion of the specific pawl, there is a great possibility that the brake actuation is again unsuccessful even if the latch is actuated in the motor displacement in which the same pressing force as the previous pressing force. Accordingly, in the present embodiment, the structure is made such that the latch 21 is again actuated after increasing the pressing force at about an interval between the pawl and the pawl of the motor rotor 10 in the case that it is determined that the parking brake actuation is unsuccessful. Not only the possibility that the parking brake actuation is normally finished is increased, but also it is possible to provide the parking brake which is stably actuated with respect to the breakage or abrasion of the pawl, by changing the pawl increasing the pressing force so as to apply the latch.

Next, after executing the step s55, the controller 3 outputs the alarm indicating the parking brake failure to the driver, in a step s60.

Further, in the present embodiment, the step counts a frequency of the matter that the latch is again actuated by determining the failure of the parking brake actuation, and determines the failure of the parking brake function in the case that the frequency reaches a prescribed frequency C. Accordingly, it is possible to avoid a state in which the pressing force is infinitely increased so as to actuate the latch. In this case, in the case that the value of the prescribed frequency C is set to zero, an operation of increasing the pressing force so as to again actuate the latch is not executed. This means that in the case that the pressing force is lowered at the prescribed amount or more between the time t1 and the time t2 or between the time t2 and the time t3 in FIG. 5, the failure of the parking brake function is immediately determined.

As described above, in accordance with the present embodiment, even in the case that the failure is generated in the parking brake function, in the vehicle in which the electromechanical brake is mounted, it is possible to keep the vehicle stop state and it is possible to improve a safety, even in the case that the failure of the parking brake is identified by securing the braking force by the brake apparatus having no parking brake function, and thereafter making the pad pressing force of the normal parking brake equal to or larger than the pad pressing force at a time of the normal parking brake, thereby generating the parking brake actuation instruction in the state in which the driver cancels the normal brake, or even in the case that the failure of the parking brake is identified after outputting the parking brake actuation instruction in the state in which the driver applies the normal brake, and canceling the normal brake.

Next, a description will be given of a structure and an operation of an electro-mechanical brake system in accordance with a second embodiment of the present invention with reference to FIG. 6. A system structure of the electro-mechanical brake system in accordance with the present embodiment is the same as that shown in FIG. 1. In this case, it is necessary that the road surface slope sensor 60 and the transmission 42 shown in FIG. 1 constitute the electronically controlled automatic transmission provided with the actuator electronically executing the shift operation or the automatic MT controlling the change of the shift gear by the actuator. Further, the structures of the electro-mechanical brake actuators 6a, 6b, 6c and 6d used in the electro-mechanical brake system in accordance with the present embodiment are the same as those shown in FIG. 2. Further, the structure and the operation of the parking brake mechanism used in the electro-mechanical brake system in accordance with the present embodiment are the same as those shown in FIG. 3.

Figure 6:
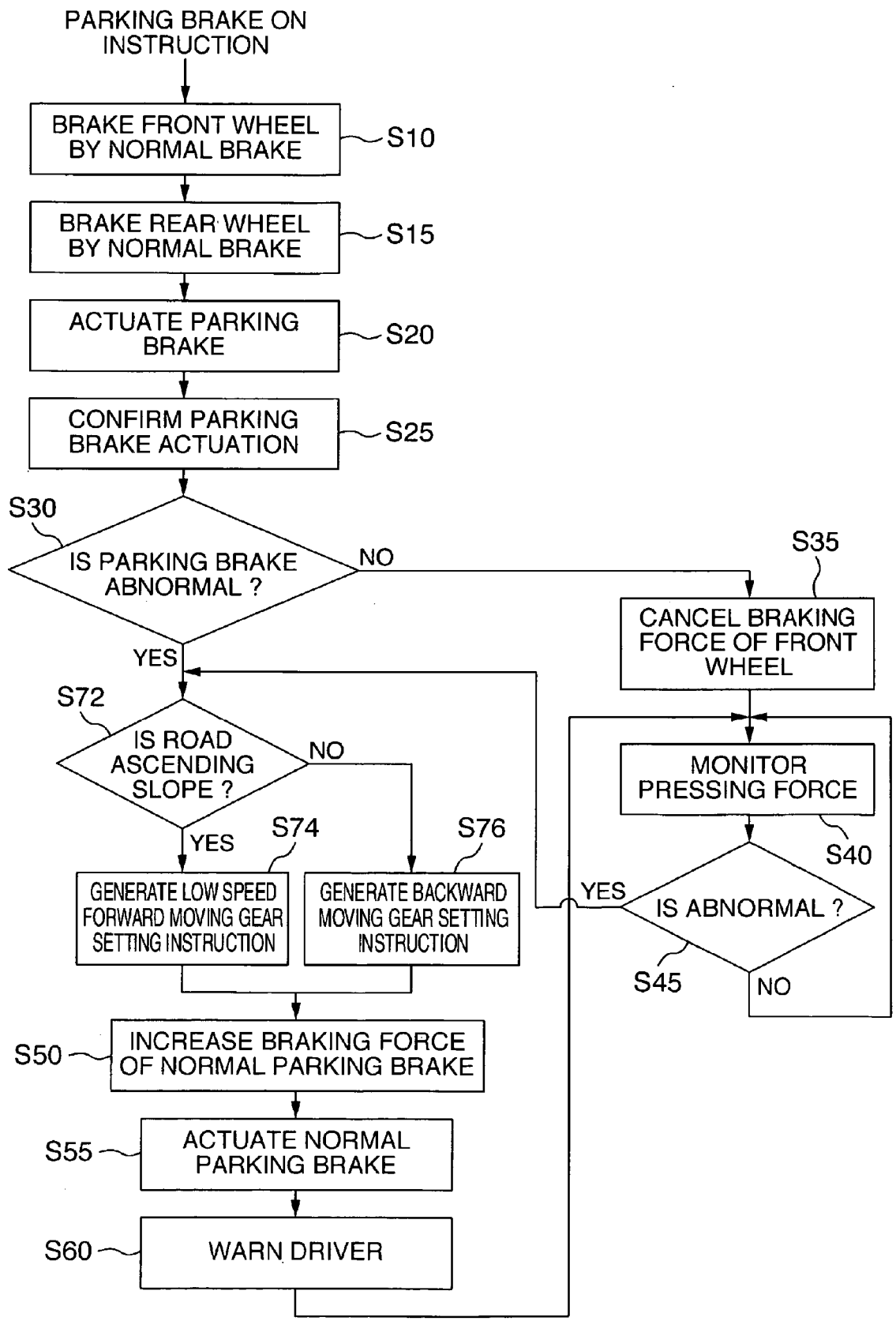
FIG. 6 is a flow chart showing an operation of an electro-mechanical brake system in accordance with a second embodiment of the present invention.

FIG. 6 is a flow chart showing an operation of the electro-mechanical brake system in accordance with the second embodiment of the present invention. In this case, the same step numbers as those in FIG. 4 indicate the same processes.

In the present embodiment, as mentioned above, there is employed the transmission which can be actuated without being constrained by the operation of the driver, the electronically controlled automatic transmission provided with the actuator electronically executing the shift operation, or the automatic MT controlling the change of the shift gear by the actuator. Further, the structure has the road surface slope sensor 60 detecting the state of the road surface slope. Further, the structure is made such as to execute the control process for securing the safety by utilizing the transmission in the case that the failure of the parking brake is identified.

In the case that the step determines in the step s30 in FIG. 6 that the abnormality exists in the parking brake, the controller 3 judges in a step s72 whether or not the road surface is an ascending slope with respect to the vehicle, on the basis of the output of the road surface slope sensor 60.

In this case, in the case that it is determined that the road surface is the ascending slope with respect to the vehicle, the controller 3 generates in a step s74 an instruction of setting the gear of the transmission 42 shown in FIG. 1 to a low speed forward moving gear, and controls the actuator of the transmission 42 so as to set to the low speed forward moving gear. On the other hand, in the case of determining that the road surface is not the ascending slope, the controller 3 generates in a step s76 an instruction of setting the gear of the transmission 42 shown in FIG. 1 to a reverse gear, and controls the actuator of the transmission 42 so as to set to the low speed forward moving gear. In this case, in the vehicle having the automatic transmission, it is possible to generate the instruction of setting to a parking range so as to set the transmission to the parking range, in the steps s74 and s76.

After the end of the steps s74 and s76, the controller 3 increases the braking force of the normal parking brake in a step s50, and executes the parking brake actuation in a step s55. Accordingly, it is possible to securely hold the vehicle stop state even on the slope road, and it is possible to secure the safety.

As described above, in accordance with the present embodiment, even in the case that the failure is generated in the parking brake function in the vehicle in which the electro-mechanical brake is mounted, it is possible to keep the vehicle stop state, and it is possible to improve the safety.

Further, in the vehicle having the transmission which is not constrained by the operation of the driver, it is possible to securely hold the vehicle stop state by utilizing the transmission at a time of the failure of the parking brake function.

Next, a description will be given of a structure and an operation of an electro-mechanical brake system in accordance with a third embodiment of the present invention, with reference to FIGS. 7 and 8. A system structure of the electro-mechanical brake system in accordance with the present embodiment is the same as that shown in FIG. 1. In this case, it is necessary that the road surface slope sensor 60 and the transmission 42 shown in FIG. 1 constitute the electronically controlled automatic transmission provided with the actuator electronically executing the shift operation or the automatic MT controlling the change of the shift gear by the actuator, and the steering wheel 50 is provided so as to control the operating direction of the vehicle body. Further, the structures of the electro-mechanical brake actuators 6a, 6b, 6c and 6d used in the electro-mechanical brake system in accordance with the present embodiment are the same as those shown in FIG. 2. Further, the structure and the operation of the parking brake mechanism used in the electro-mechanical brake system in accordance with the present embodiment are the same as those shown in FIG. 3.

Figure 7:
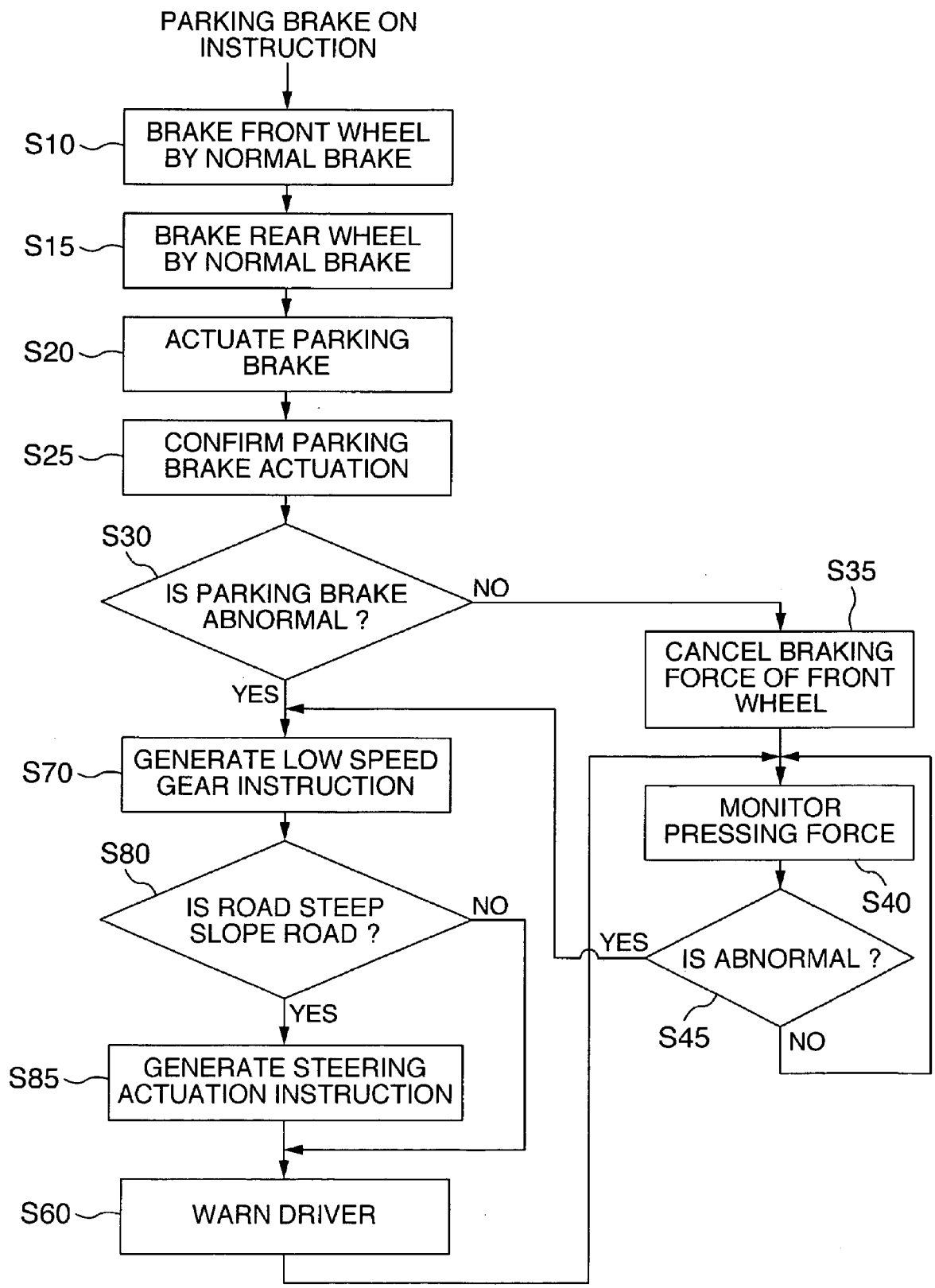
FIG. 7 is a flow chart showing an operation of an electro-mechanical brake system in accordance with a third embodiment of the present invention.

FIG. 7 is a flow chart showing an operation of the electro-mechanical brake system in accordance with the third embodiment of the present invention. In this case, the same step numbers as those in FIG. 4 indicate the same processes.

FIG. 8 is an explanatory view of a steering operation in the electro-mechanical brake system in accordance with the third embodiment of the present invention.

In the present embodiment, as mentioned above, there is employed the transmission which can be actuated without being constrained by the operation of the driver, the electronically controlled automatic transmission provided with the actuator electronically executing the shift operation, or the automatic MT controlling the change of the shift gear by the actuator. Further, the structure has the road surface slope sensor 60 detecting the state of the road surface slope. Further, the structure has the steering wheel 50 capable of controlling the operating direction of the vehicle body. Further, the structure is made such as to execute the control process for securing the safety by utilizing the transmission in the case that the failure of the parking brake is identified.

In the case that the step determines in the step s30 in FIG. 7 that the abnormality exists in the parking brake, the controller 3 generated the low speed gear instruction in the step s70. In the case of the automatic transmission, it is possible to set to the parking range. The contents of the step s70 is the same control contents as those of the steps s72, s74 and s76 in FIG. 6.

Next, in a step s80, the controller 3 judges whether or not the slope of the road surface is a steep slope equal to or more than a prescribed value, on the basis of the road surface slope sensor 60. If it is determined that the slope is the steep slope, the controller 3 generates in a step s85 an instruction of operating the steering wheel. It is possible to increase the friction force between the road surface and the wheel so as to more stably hold the vehicle stop state, by operating the steering wheel.

After the end of the step s85, the controller 3 increases the braking force of the normal parking brake in the step s50, and executes the parking brake actuation in the step s55. Accordingly, it is possible to securely hold the vehicle stop state even on the slope road, and it is possible to secure the safety.

Figure 8A:
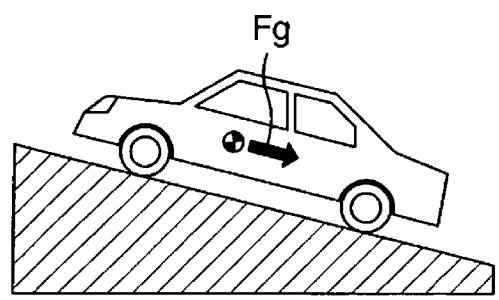
FIGS. 8A-8D are an operation explanatory view of a steering operation in the electro-mechanical brake system in accordance with the third embodiment of the present invention.

In this case, a description will be given of an operation instruction generating method of the steering wheel by using FIG. 8. In this case, a description will be given by exemplifying the case that the parking brake function of the right rear wheel 8c shown in FIG. 8B is failed on the ascending slope as shown in FIG. 8A, and the vehicle stop state is held only by the parking brake.

Figure 8B:
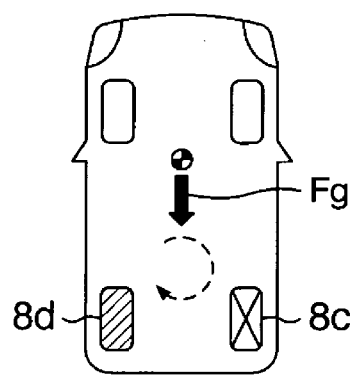
Figure 8C:
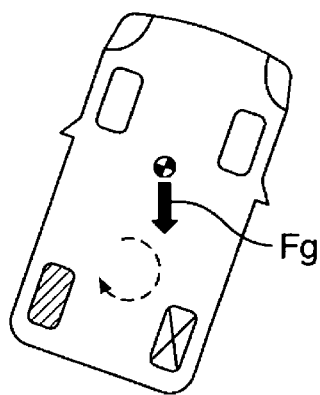
Figure 8D:
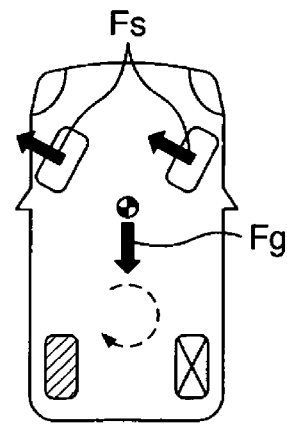

As shown in FIG. 8B, a slope road slope direction component Fg of gravity is applied to a center of gravity of the vehicle body in the ascending slope. Accordingly, a moment (shown by a broken line in the drawing) in a clockwise direction is generated around the left rear wheel 8c braked by the parking brake. In the case that the incline of the slope is steep, the vehicle body is inclined as shown in FIG. 8C on the basis of this moment. In the case mentioned above, in accordance with the present embodiment, the friction force in the left forward direction is generated between the front wheel and the road surface by rotating the steering wheel of the front wheel in the right direction and inclining the front wheel in the right direction as shown in FIG. 8D, whereby it is possible to generate a moment (shown by a solid arrow) canceling the moment mentioned above. Accordingly, it is possible to avoid the vehicle body from being inclined as shown in FIG. 8C. On the contrary, in the case that the parking brake function of the right rear wheel is normal, and the parking brake of the left rear wheel gets out of order, it is possible to avoid the incline of the vehicle body by executing the reverse operation to that mentioned above.

As described above, in accordance with the present embodiment, even in the case that the failure is generated in the parking brake function in the vehicle in which the electro-mechanical brake is mounted, it is possible to keep the vehicle stop state, and it is possible to improve the safety.

Further, in the vehicle having the transmission and the steering wheel which are not constrained by the operation of the driver, it is possible to securely hold the vehicle stop state by utilizing the transmission and the steering wheel at a time of the failure of the parking brake function.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electro-mechanical brake system comprising:
a plurality of brake apparatuses, each pressing a braking member to a braked member so as to independently control braking forces of respective wheels;
a plurality of parking brakes; and
a parking brake malfunction detecting means for detecting a malfunction of said parking brakes,
wherein one or more brake apparatuses are provided with one of the parking brakes and one or more brake apparatuses are not provided with one of the parking brakes,
wherein the electro-mechanical brake system is provided with a control means for increasing a pressing force between the braking member and the braked member in each of the brake apparatuses that is provided with a parking brake in which a malfunction has not been detected, in the case that a parking brake failure in one wheel or more is detected by said parking brake malfunction detecting means.

2. An electro-mechanical brake system as claimed in claim 1, wherein said control means starts operation of the parking brakes and generates a pressing force applied by the brake apparatuses that temporarily maintains a vehicle stop state in each of the brake apparatuses which is not provided with one of the parking brakes, in the case that a parking brake actuation instruction is generated.

3. An electro-mechanical brake system as claimed in claim 2, wherein said control means cancels the pressing force applied by the brake apparatuses which are not provided with the parking brakes, in the case that a parking brake function is achieved after a parking brake actuation instruction is generated.

4. An electro-mechanical brake system as claimed in claim 1, wherein the electro-mechanical brake system is provided with a transmission capable of operating without being constrained by an operation of a driver, and said control means further generates an actuation instruction of making said transmission select a predetermined low speed change gear ratio.

5. An electro-mechanical brake system as claimed in claim 4, wherein the electro-mechanical brake system is provided with a road surface slope state detecting means for detecting a state of a road surface slope state, and said control means changes an actuation instruction for actuating said transmission on the basis of the slope state of the road surface detected by said road surface slope state detecting means at a time when the malfunction of the parking brake is detected.

* * * * *